United States Patent
Choi et al.

(10) Patent No.: US 8,515,346 B2
(45) Date of Patent: *Aug. 20, 2013

(54) ELECTRONIC APPARATUS HAVING CONTROL FUNCTION USING HUMAN BODY COMMUNICATION AND PORTABLE TERMINAL HAVING ELECTRONIC APPARATUS CONTROL FUNCTION USING HUMAN BODY COMMUNICATION

(75) Inventors: Byoung Gun Choi, Daegu (KR); Sung Eun Kim, Seoul (KR); Sung Weon Kang, Daejeon (KR); Jung Hwan Hwang, Daejeon (KR); Tae Young Kang, Daejeon (KR); Tae Wook Kang, Daejeon (KR); Kyung Soo Kim, Daejeon (KR); Jung Bum Kim, Daejeon (KR); Kyung Hwan Park, Daejeon (KR); Hyung Il Park, Daejeon (KR); In Gi Lim, Daejeon (KR); Seok Bong Hyun, Daejeon (KR); Chang Hee Hyoung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 43 days.

This patent is subject to a terminal disclaimer.

(21) Appl. No.: 12/950,988

(22) Filed: Nov. 19, 2010

(65) Prior Publication Data
US 2011/0151785 A1    Jun. 23, 2011

(30) Foreign Application Priority Data

Dec. 22, 2009  (KR) .................. 10-2009-0129266
May 12, 2010   (KR) .................. 10-2010-0044418

(51) Int. Cl.
*H04B 5/00*       (2006.01)

(52) U.S. Cl.
USPC ....... 455/41.1; 455/41.2; 455/66.1; 340/5.52; 340/691.1; 370/445

(58) Field of Classification Search
USPC .......... 455/41.1, 41.2, 66.1, 100, 344, 556.1, 455/556.2; 340/5.52, 691.1; 370/445
See application file for complete search history.

(56) References Cited

U.S. PATENT DOCUMENTS

| | | | |
|---|---|---|---|
| 8,150,319 B2 * | 4/2012 | Yoshida et al. | ............. 455/41.2 |
| 2009/0309751 A1 * | 12/2009 | Kano et al. | ............. 340/825.25 |
| 2010/0274083 A1 | 10/2010 | Hyoung et al. | |

FOREIGN PATENT DOCUMENTS

| | | |
|---|---|---|
| KR | 1020060085997 A | 7/2006 |
| KR | 1020080111619 A | 12/2008 |
| KR | 10-2009-0009415 A | 1/2009 |
| KR | 10-2009-0064939 A | 6/2009 |

* cited by examiner

*Primary Examiner* — Tuan H Nguyen

(57) ABSTRACT

An electronic apparatus having a control function using human body communication includes: a first control unit reading control data and performing a control to provide the read control data; a first human body communication unit converting the control data into a signal, which is transmittable through human body communication, according to a control signal outputted from the first control unit; an electrode installed in an outer housing of the electronic apparatus and transmitting the signal provided from the first human body communication unit to a user's body which comes into contact with the electronic apparatus; and a first storage unit storing the control data.

11 Claims, 5 Drawing Sheets

ELECTRONIC APPARATUS HAVING CONTROL FUNCTION USING HUMAN BODY COMMUNICATION AND PORTABLE TERMINAL HAVING ELECTRONIC APPARATUS CONTROL FUNCTION USING HUMAN BODY COMMUNICATION

CROSS-REFERENCE TO RELATED APPLICATIONS

This application claims the priority of Korean Patent Application Nos. 10-2009-0129266 filed on Dec. 22, 2009 and 10-2010-0044418 filed on May 12, 2010, in the Korean Intellectual Property Office, the disclosures of which are incorporated herein by reference.

BACKGROUND OF THE INVENTION

1. Field of the Invention

The present invention relates to the control of an electronic apparatus, and more particularly, to an electronic apparatus having a control function using human body communication and a portable terminal having an electronic apparatus control function using human body communication, whereby electronic apparatuses can be conveniently controlled through human body communication.

2. Description of the Related Art

Generally, the operations and functions of electronic apparatuses, such as television sets, audio/video systems, air conditioners, and so on, are controlled using buttons provided on external housings thereof or remote controllers separately provided. However, as the number of electronic apparatuses increases, the number of different remote controllers also increases and thus it is difficult to manage and store them.

Learning remote controllers capable of solving the above-described inconvenience have been commercially available. However, their initial setting is complicated because a user must teach the learning remote controllers functions corresponding to buttons of remote controllers. Also, when a battery thereof is discharged, the taught data is reset, and thus, the user must again teach the learning remote controllers.

Furthermore, portable terminals (e.g., mobile phones) with a built-in remote control function have recently been manufactured. To this end, portable terminal manufacturers must embed remote control functions in advance according to electronic apparatus manufactures and models. Therefore, such portable terminals cannot be used in electronic apparatuses whose remote control functions are not embedded. Even in the case that the remote control function is embedded, the use of the portable terminals may be inconvenient when the keys of the portable terminal and the keys of the remote controller do not exactly coincide with one another.

SUMMARY OF THE INVENTION

An aspect of the present invention provides an electronic apparatus having a control function using human body communication, which can conveniently control the electronic apparatus.

An aspect of the present invention also provides a portable terminal having an electronic apparatus control function using human body communication, which can conveniently control the electronic apparatus.

According to an aspect of the present invention, there is provided an electronic apparatus having a control function using human body communication, the electronic apparatus including: a first control unit reading control data and performing a control to provide the read control data; a first human body communication unit converting the control data into a signal, which is transmittable through human body communication, according to a control signal outputted from the first control unit; an electrode installed in an outer housing of the electronic apparatus and transmitting the signal provided from the first human body communication unit to a user's body which comes into contact with the electronic apparatus; and a first storage unit storing the control data.

The electronic apparatus may further include a control signal reception unit receiving a control signal provided from an external apparatus through a wireless interface, processing the received control signal, and providing the processed control signal to the first control unit.

The first human body communication unit may process a control signal provided from an external apparatus through the electrode which comes into contact with a user's body, and provide the processed control signal to the first control unit.

The first control unit may generate an apparatus control signal for controlling the electronic apparatus according to the control signal provided from the first human body communication unit.

The control data may be a software program for controlling the electronic apparatus.

According to another aspect of the present invention, there is provided a portable terminal having an electronic apparatus control function using human body communication, the portable terminal including: a second human body communication unit receiving control data from one or more electronic apparatuses through a user's body and providing the received control data; a second control unit storing the control data and configuring control menus for controlling the electronic apparatuses, based on the control data; an input/output unit displaying the control menus according to the control of the second control unit; and a second storage unit storing the control data of the electronic apparatuses.

When a predetermined control menu among the displayed control menus is selected, the second control unit may provide the second human body communication unit with control signals corresponding to the selected control menu.

The second human body communication unit may convert the control signals corresponding to the predetermined control menu provided from the second control unit into signals, which are transmittable through human body communication, and transmit the converted signals to the electronic apparatuses through the user's body.

The portable terminal may further include a control signal transmission unit processing control signals provided from the second control unit, and transmitting the processed control signals to the electronic apparatuses through a wireless interface.

The control data may be a software program for controlling the electronic apparatuses.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
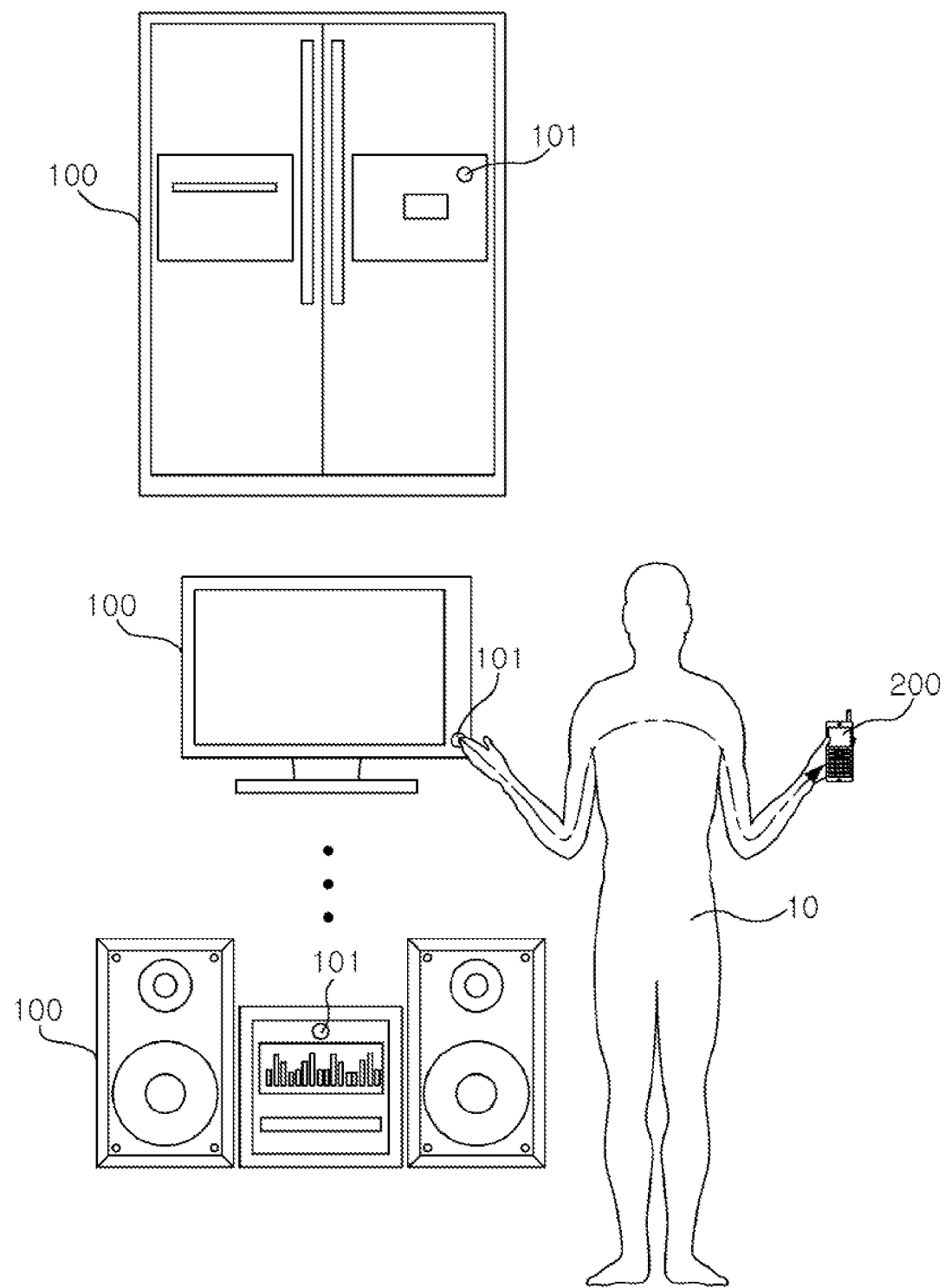
FIGS. 1 through 3 are conceptual diagrams explaining an electronic apparatus having a control function using human body communication according to an embodiment of the present invention, and an operation of a portable terminal having an electronic apparatus control function using human body communication.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

However, the present invention is not limited to specific embodiments, and may include all modifications, equivalents, and substitutes included in the technical spirit and scope of the present invention.

It will be understood that although the terms "first" and "second" are used herein to describe various elements, these elements should not be limited by these terms. These terms are merely used herein to distinguish one element from another element. For example, a first element may be designated as a second element, without departing from the spirit and scope of the invention as defined by the appended claims. Similarly, the second element may be designated as the first element. The term "and/or" may include a combination of plural relevant described articles or any one of plural relevant described articles.

When it is stated that one component is "connected" or "linked" to another component, the one component may be directly connected or linked to another component. However, it will be understood that yet another component may exist therebetween. On the other hand, when it is described that one component is "directly connected" or "directly linked" to another component, it will be understood that yet another component does not exist therebetween.

The terms used in this specification are used for describing specific embodiments and do not limit the scope of the present invention. A singular expression may include a plural expression, as long as they are obviously different from each other in context. In this application, the meaning of "include" or "have" specifies a property, a fixed number, a step, a process, an element, a component, and/or a combination thereof but does not exclude other properties, fixed numbers, steps, processes, elements, components, and/or combinations thereof.

The terms used herein, including technical and scientific terms, have the same meanings as terms that are generally understood by those skilled in the art, as long as the terms are differently defined. It should be understood that terms defined in a generally-used dictionary have meanings coinciding with those of terms in the related technology. As long as the terms are not defined obviously, they are not to be ideally or excessively analyzed as having formal meanings.

Figure 2:
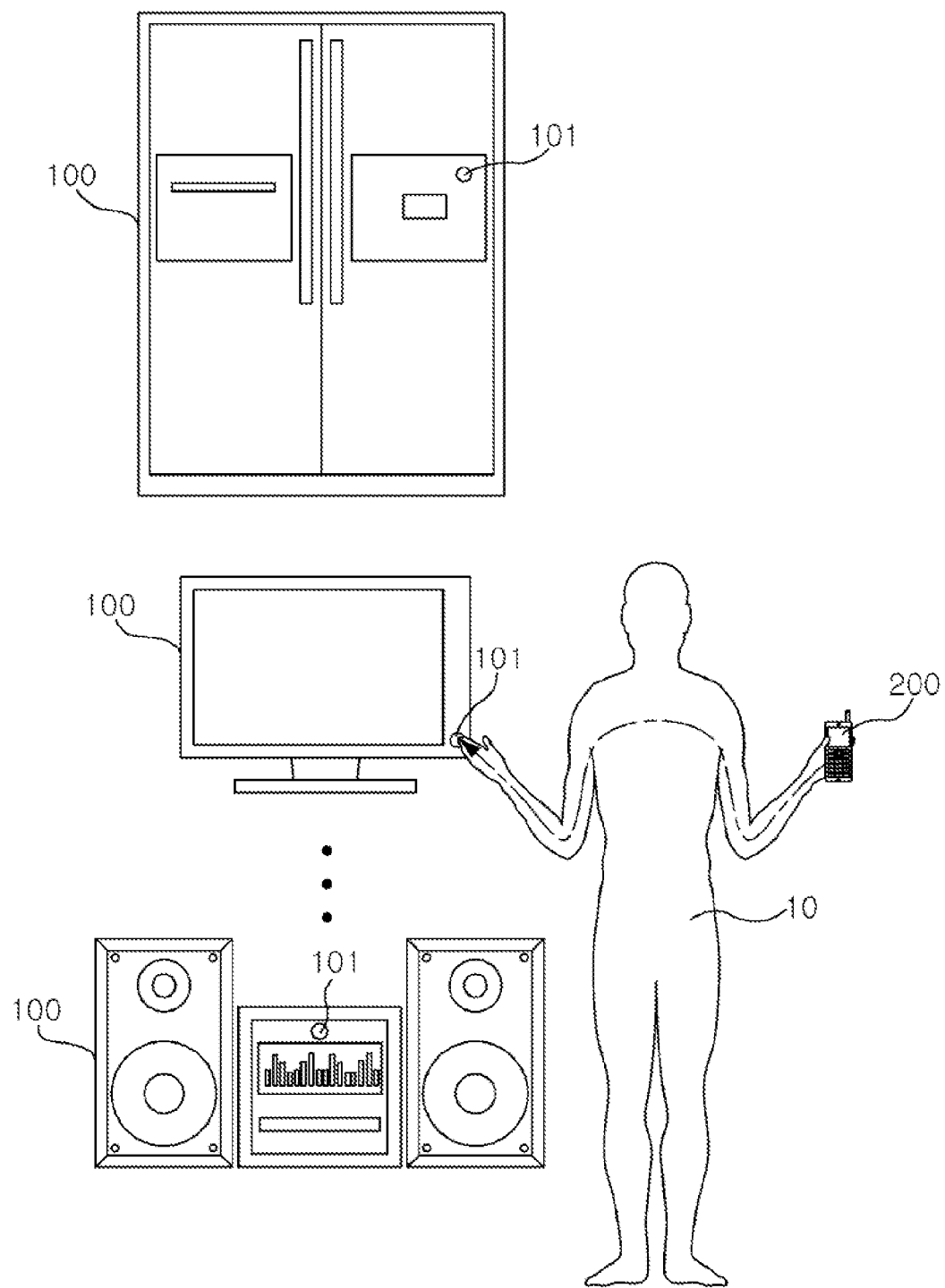
Figure 3:
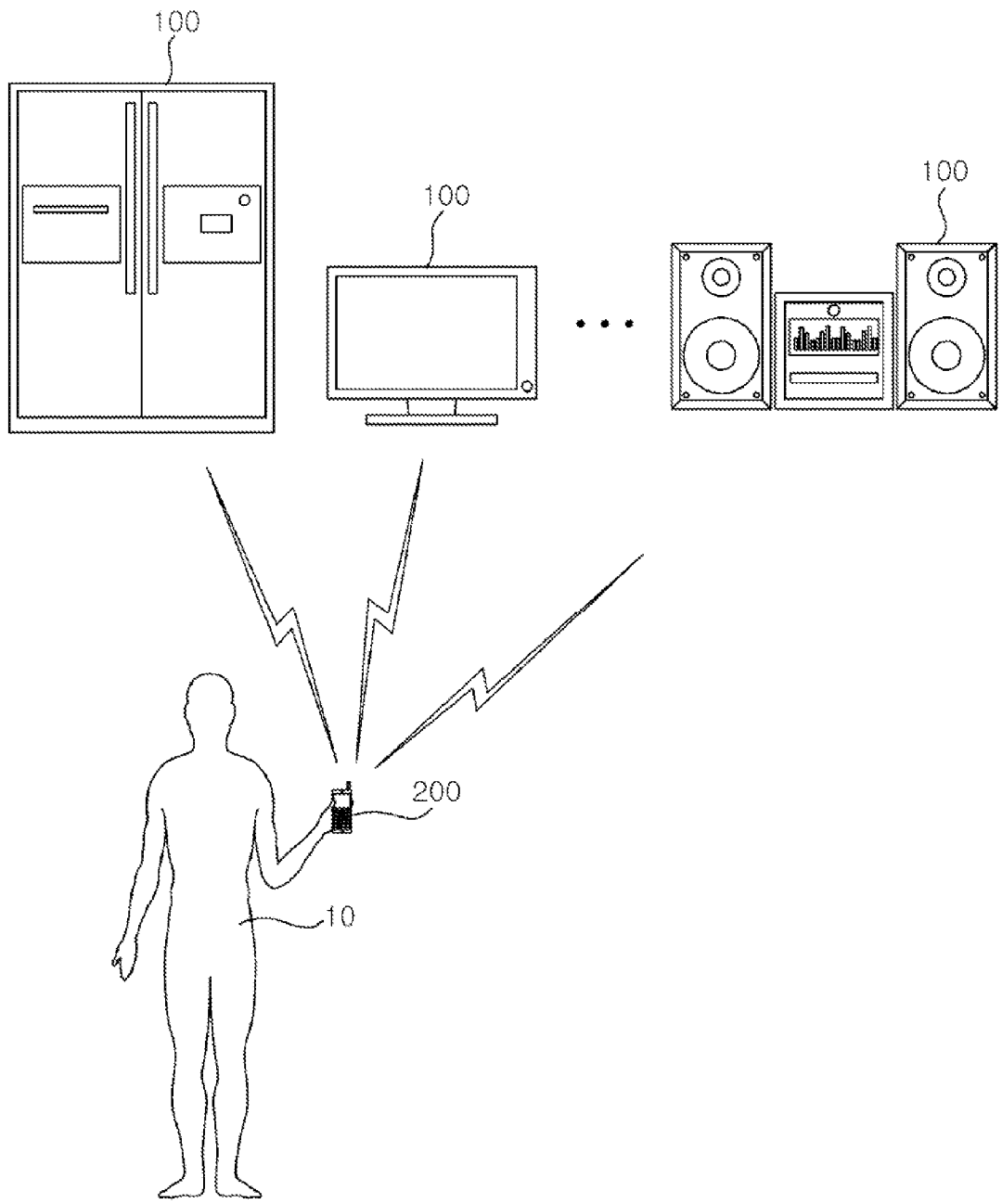

FIGS. 1 through 3 are conceptual diagrams explaining an electronic apparatus having a control function using human body communication according to an embodiment of the present invention, and an operation of a portable terminal having an electronic apparatus control function using human body communication.

Referring to FIG. 1, various electronic apparatuses 100, such as a refrigerator, a television set, and an audio system, have human body communication functions and include electrodes 101 installed in external housings, wherein the electrodes 101 can come into contact with the user's body 10. Also, the electronic apparatuses 100 store control data in nonvolatile memories provided therein, and provide the control data to a portable terminal 200 contacted with the user's body 10 through human body communication. The control data may refer to a software program which can control the electronic apparatuses 100.

For example, when the user touches the electrode 101 of the electronic apparatus 100 in such a state that the user is in contact with the portable terminal 200, the electronic apparatus 100 reads the stored control data, converts the read control data into signals which can be transmitted through human body communication, and provides the converted signals to the electrode 101. The control data provided to the electrode 101 is downloaded into the portable terminal 200 through the user's body 10. The portable terminal 200 also has a human body communication function and an electrode (not shown) which can come into contact with the user's body 10 in order for human body communication to occur.

The portable terminal 200 which has downloaded the control data of the electronic apparatuses 100 using human body communication processes the control data and displays an electronic apparatus control menu on a display unit of the portable terminal 200. When the control data regarding the plurality of electronic apparatuses 100 is stored in the portable terminal 200, the portable terminal 200 may display an electronic apparatus selection menu to allow the user to select a specific electronic apparatus, and then display the control menu for controlling the electronic apparatus which is selected by the user.

As illustrated in FIG. 1, the portable terminal 200 may download the control data from the electronic apparatuses 100 through human body communication and control the electronic apparatuses 100 by using the downloaded control data.

The portable terminal 200 may control the electronic apparatuses 100 by using human body communication or may control the electronic apparatuses 100 by using wireless communication.

The operation of controlling the electronic apparatuses using human body communication will be described below with reference to FIG. 2. When the user selects a predetermined control menu for a predetermined electronic apparatus (e.g., a television set), which is displayed on the portable terminal 200, and contacts the electrode 101 of the electronic apparatus 100 to be controlled, in such a state that the user comes into contact with the portable terminal 200, the portable terminal 200 converts the control data corresponding to the control item selected by the user in accordance with a human body communication standard (or protocol) in order to enable human body communication. Then, the portable terminal 200 transmits the converted control data to the electrode 101 of the electronic apparatus 100 through the user's body 10, and performs the operation or function corresponding to the control signals received through the electrode 101 thereof.

As illustrated in FIG. 3, the portable terminal 200 may control the electronic apparatuses through wireless communication. Referring to FIG. 3, the portable terminal 200 may control the electronic apparatuses by downloading the control data from the electronic apparatuses through human body communication, converting the control data selected by the user through a wireless control module (e.g., an infrared transmission module or an RF transmission module) in accordance with a wireless transmission protocol, and transmitting the converted control data to the corresponding electronic apparatuses.

Figure 4:
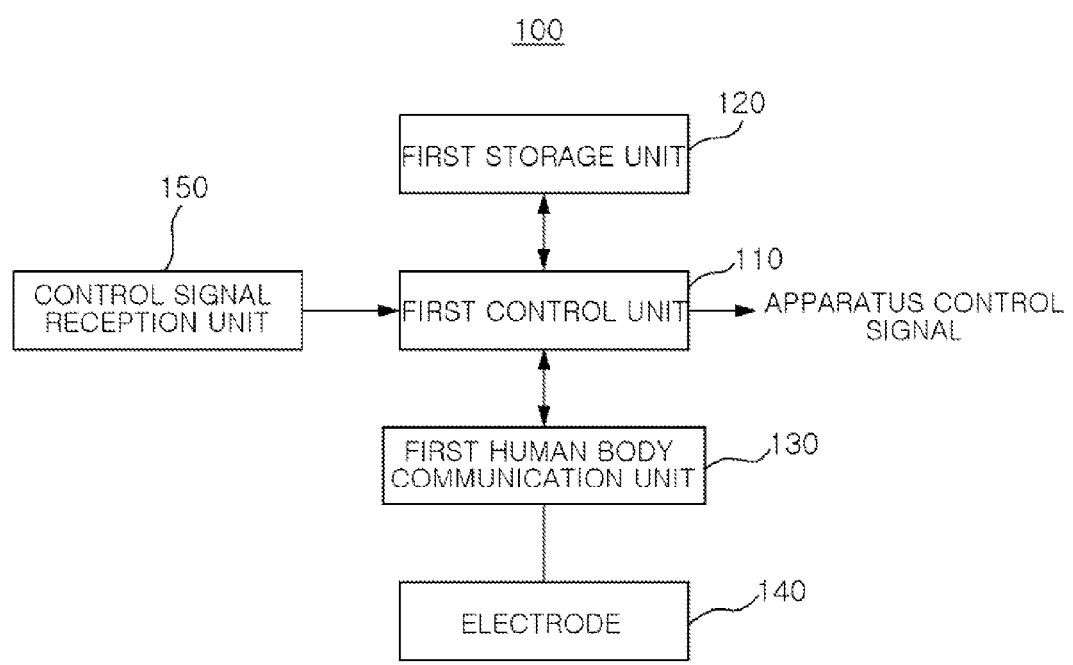
FIG. 4 is a block diagram illustrating the configuration of the electronic apparatus having the control function using human body communication according to the embodiment of the present invention.

FIG. 4 is a block diagram illustrating the configuration of the electronic apparatus having the control function using human body communication according to the embodiment of the present invention. Well-known structures will not be described in detail to avoid an ambiguous interpretation of the present invention.

Referring to FIG. 4, the electronic apparatus 100 having the control function using human body communication may include a first control unit 110, a first storage unit 120, a first human body communication unit 130, an electrode 140, and a control signal reception unit 150.

When the first control unit 110 determines that the user's body comes into contact with the electrode 140, it reads the control data stored in the first storage unit 120, provides the read control data to the first human body communication unit 130, and performs a control to allow the control data to be transmitted to the user's body through the electrode 140.

Also, the first control unit 110 receives a control signal from the first human body communication unit 130 or the control signal reception unit 150 and generates apparatus control signals which control the function or operation of the electronic apparatus according to the received control signals.

The first storage unit 120 stores the control data. The control data may be a software program designed to control the electronic apparatus.

The first human body communication unit 130 converts the control data provided from the first control unit 110 into signals, which can be transmitted through human body communication, in accordance with the human body communication standard (or protocol), and then transmits the converted signals through the electrode 140 to the user's body which is in contact with the electrode 140.

Also, the first human body communication unit 130 receives the control signals provided from the user's body through the electrode 140, processes the received control signals, and provides the processed control signals to the first control unit 110. The control signals represent signals which control the function or operation of the electronic apparatus.

The electrode 140 may be installed in the external housing of the electronic apparatus which can be easily contacted with the user's body. The electrode 140 transmits the signals provided from the first human body communication unit 130 to the user's body contacted with the electronic apparatus, or provides the signals from the user's body to the first human body communication unit 130.

The control signal reception unit 150 may be implemented with an RF reception module, an infrared reception module, or a Bluetooth reception module. The control signal reception unit 150 processes the control signals provided from the portable terminal through the wireless interface, and provides the processed control signals to the first control unit 110.

Figure 5:
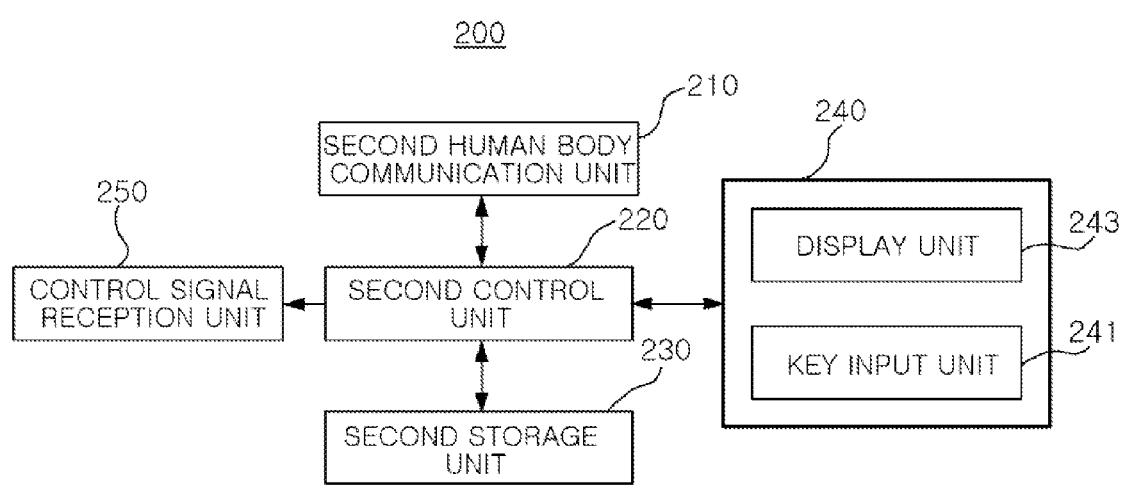
FIG. 5 is a block diagram illustrating the configuration of the portable terminal having the electronic apparatus control function according to the embodiment of the present invention.

FIG. 5 is a block diagram illustrating the configuration of the portable terminal having the control function for the electronic apparatus according to the embodiment of the present invention.

Referring to FIG. 5, the portable terminal 200 according to the embodiment of the present invention may include a second human body communication unit 210, a second control unit 220, a second storage unit 230, an input/output unit 240, and a control signal transmission unit 250.

The second human body communication unit 210 may include an electrode (not shown) which can come into contact with the user's body. When the user's body comes into contact with the electrode 140 provided in the electronic apparatus, the second human body communication unit 210 receives the control data transmitted through the user's body, processes the received control data, and provides the processed control data to the second control unit 220. The second human body communication unit 210 may perform a process such as, a demodulation, on the signals received through the user's body and provide the processed signals to the second control unit 220.

Also, the second human body communication unit 210 may convert the control signals provided from the second control unit 220 into signals, which can be transmitted through human body communication, by processing the control signals in accordance with human body communication protocol, and transmit the converted signals to the electronic apparatus 100 through the user's body. The second human body communication unit 210 may perform a process, such as a demodulation, on the control signals provided from the second control unit 220, and transmit the processed control signals.

The second control unit 220 stores the control data, which is transmitted from the electronic apparatus 100 through the second human body communication unit 210, in the second storage unit 230. When the download of the control data is completed and the electronic apparatus control function is enabled according to the user's manipulation, the second control unit 220 reads the control data from the second storage unit 230, configures the control menu, and provides it to the input/output unit 240. When control data for a plurality of electronic apparatuses is stored in the second storage unit 230, the second control unit 220 may display the electronic apparatus selection menu which allows the user to select the target electronic apparatus, and then display the control menu of the electronic apparatus selected by the user.

Also, when the user selects a predetermined control menu among the displayed control menus, the second control unit 220 provides the control signal corresponding to the selected control menu to the second human body communication unit 210 or the control signal transmission unit 250.

The second storage unit 230 includes the control data downloaded from at least one electronic apparatus according to the control of the second control unit 220. The control data may be a software program designed to control the electronic apparatuses.

The input/output unit 240 may be implemented with a touch screen and may display the electronic apparatus selection menu or the electronic apparatus control menu according to the control of the second control unit 220. Furthermore, the input/output unit 240 provides the second control unit 220 with a menu manipulation signal corresponding to the menu item manipulated by the user among the displayed menus.

According to another embodiment of the present invention, the input/output unit 240 may include a key input unit 241 and a display unit 243 separately. The display unit 243 may be implemented with a liquid crystal display (LCD) or an organic light emitting diode (OLED).

The control signal transmission unit 250 may include an RF transmission module, an infrared transmission module, or a Bluetooth transmission module. The control signal transmission unit 250 processes the control signals received from the second control unit 220 and provides the processed control signals to the corresponding electronic apparatus through the wireless interface.

The portable terminal 200 illustrated in FIG. 5 may be a mobile phone, a personal digital assistant (PDA), or a portable multimedia player (PMP).

As set forth above, in the electronic apparatus having the control function using human body communication and the portable terminal having the electronic apparatus control function using human body communication, the control data stored in each electronic apparatus is downloaded into the portable terminal through human body communication, and the control menu is configured using the downloaded control data. Then, the control signals corresponding to the user's selection are transmitted to the corresponding electronic apparatus through human body communication or the wireless interface.

Therefore, the electronic apparatuses can be controlled conveniently and easily, and the control optical to the electronic apparatuses can be achieved.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic apparatus having a control function using human body communication, the electronic apparatus comprising:
   a control unit configured to read control data for controlling the electronic apparatus and perform a control operation to provide the control data to a portable terminal;
   a human body communication unit configured to convert the control data into a signal, which is transmittable through the human body communication;
   an electrode installed in an outer housing of the electronic apparatus and configured to transmit the signal provided from the human body communication unit to the portable terminal through a user's body, which comes into contact with the electronic apparatus; and
   a storage unit configured to store the control data,
   wherein the control unit is configured to receive a control signal corresponding to a target control menu from the portable terminal, the target control menu being selected from among control menus configured by the portable terminal based on the control data, and control an operation or function of the electronic apparatus according to the control signal.

2. The electronic apparatus of claim 1, further comprising a control signal reception unit configured to receive a control signal provided from an external apparatus through a wireless interface, process the received control signal, and provide the processed control signal to the control unit.

3. The electronic apparatus of claim 1, wherein the human body communication unit is configured to process the control signal provided from the portable terminal through the electrode, which comes into contact with the user's body, and provide the processed control signal to the control unit.

4. The electronic apparatus of claim 3, wherein the control unit is configured to generate an apparatus control signal for controlling the electronic apparatus based on the control signal provided from the human body communication unit.

5. The electronic apparatus of claim 1, wherein the control data is a software program for controlling the electronic apparatus.

6. A portable terminal having an electronic apparatus control function using human body communication, the portable terminal comprising:
   a human body communication unit configured to receive control data for controlling an electronic apparatus from the electronic apparatus through a user's body and provide the control data to a control unit;
   the control unit configured to store the control data in a storage unit and configure control menus for controlling the electronic apparatus based on the control data when the electronic apparatus control function is enabled;
   an input/output unit configured to display the control menus configured by the control unit; and
   the storage unit configured to store the control data,
   wherein the control unit is configured to provide a control signal corresponding to a target control menu selected from among the displayed control menus, to the electronic apparatus.

7. The portable terminal of claim 6, wherein, when the target control menu is selected, the control unit is configured to provide the human body communication unit with the control signal corresponding to the selected target control menu.

8. The portable terminal of claim 7, wherein the human body communication unit is configured to convert the control signal corresponding to the target control menu provided from the control unit into a signal, which is transmittable through the human body communication, and transmit the converted signal to the electronic apparatus through the user's body.

9. The portable terminal of claim 6, further comprising a control signal transmission unit configured to process the control signal provided from the control unit, and transmit the processed control signal to the electronic apparatus through a wireless interface.

10. The portable terminal of claim 6, wherein the control data is a software program for controlling the electronic apparatus.

11. The portable terminal of claim 6, wherein if the control data is received from a plurality of electronic apparatuses, the control unit is configured to allow the input/output unit to display an apparatus selection menu prior to displaying the control menus.

* * * * *